United States Patent
Schram et al.

(10) Patent No.: US 7,656,135 B2
(45) Date of Patent: Feb. 2, 2010

(54) METHOD AND APPARATUS FOR CONTROLLING ROTARY MACHINES

(75) Inventors: Christian Schram, Munich (DE); Henning Luetze, Bad Bentheim (DE); Andreas Buecker, Hasbergen (DE); Andre Riesberg, Wallenhorst (DE); Robert William Delmerico, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 565 days.

(21) Appl. No.: 11/620,139

(22) Filed: Jan. 5, 2007

(65) Prior Publication Data

US 2008/0164697 A1 Jul. 10, 2008

(51) Int. Cl.
*H02P 9/10* (2006.01)
*H02P 9/14* (2006.01)
*F01D 21/04* (2006.01)
*F01D 21/14* (2006.01)

(52) U.S. Cl. .......................................... 322/59; 415/14
(58) Field of Classification Search .................. 322/59; 415/14
See application file for complete search history.

(56) References Cited

U.S. PATENT DOCUMENTS

| | | | | | |
|---|---|---|---|---|---|
| 4,405,283 | A * | 9/1983 | Owsianny | ..................... | 415/14 |
| 4,578,942 | A * | 4/1986 | Weiler | ......................... | 415/134 |
| 4,994,684 | A | 2/1991 | Lauw et al. | ..................... | 290/52 |
| 5,028,804 | A | 7/1991 | Lauw | ......................... | 290/40 C |
| 5,263,816 | A * | 11/1993 | Weimer et al. | ............... | 415/131 |
| 5,545,007 | A * | 8/1996 | Martin | ..................... | 415/173.2 |
| 6,005,462 | A * | 12/1999 | Myers | ......................... | 335/220 |
| 6,273,671 | B1 * | 8/2001 | Ress, Jr. | ......................... | 415/1 |
| 6,335,631 | B2 * | 1/2002 | Kliman et al. | ............... | 324/772 |
| 6,566,775 | B1 * | 5/2003 | Fradella | ..................... | 310/90.5 |
| 6,603,230 | B1 * | 8/2003 | Abel | ......................... | 310/90.5 |
| 6,700,242 | B2 * | 3/2004 | Kawamura | ................ | 310/68 R |
| 6,794,777 | B1 * | 9/2004 | Fradella | ..................... | 310/74 |
| 7,220,097 | B2 * | 5/2007 | Boeck | ......................... | 415/14 |
| 7,581,921 | B2 * | 9/2009 | Bagepalli et al. | ............... | 415/14 |
| 2002/0084705 | A1 * | 7/2002 | Kawamura | ................ | 310/68 R |
| 2003/0141773 | A1 * | 7/2003 | Abel | ......................... | 310/90.5 |
| 2006/0120851 | A1 * | 6/2006 | Boeck | ......................... | 415/14 |
| 2007/0128016 | A1 * | 6/2007 | Dasgupta et al. | ............... | 415/14 |
| 2007/0290873 | A1 * | 12/2007 | Jensen | ..................... | 340/686.4 |
| 2007/0292260 | A1 * | 12/2007 | Bagepalli et al. | ............... | 415/14 |
| 2008/0309091 | A1 * | 12/2008 | Hahlbeck | ..................... | 290/55 |

FOREIGN PATENT DOCUMENTS

EP 578285 A1 * 1/1994
EP 1870566 A1 * 12/2007

* cited by examiner

*Primary Examiner*—Nicholas Ponomarenko
*Assistant Examiner*—Pedro J Cuevas
(74) *Attorney, Agent, or Firm*—James McGinness, Esq.; Armstrong Teasdale LLP

(57) ABSTRACT

A wind turbine generator includes at least one rotating member, at least one stationary member, and a clearance gap control system. The stationary member is positioned such that a clearance gap is defined between a portion of the rotating member and a portion of the stationary member. The clearance gap is configured to facilitate transmitting a controllable magnetic flux therethrough. The control system includes at least one clearance gap measurement assembly, at least one power converter, and at least one controller. The controller is coupled in electronic data communication with the assembly and the converter and is configured to modulate a dimension of the gap by modulating the flux.

20 Claims, 5 Drawing Sheets

METHOD AND APPARATUS FOR CONTROLLING ROTARY MACHINES

BACKGROUND OF THE INVENTION

This invention relates generally to rotary machines and more particularly, to methods and apparatus for controlling wind turbine generator air gap dimensions.

Generally, a wind turbine generator includes a rotor having multiple blades. The rotor is sometimes mounted within a housing, or nacelle, that is positioned on top of a base, for example a truss or tubular tower. At least some known utility grade wind turbines (i.e., wind turbines designed to provide electrical power to a utility grid) can have rotors of 30 meters (m) (98 feet (ft)) or more in diameter. The rotor blades transform mechanical wind energy into a mechanical rotational torque that drives one or more generators. The generators are sometimes, but not always, rotationally coupled to the rotor through a gearbox. The gearbox steps up the inherently low rotational speed of the turbine rotor for the generator to efficiently convert the rotational mechanical energy to electrical energy, which is fed into the utility grid. Gearless direct drive wind turbine generators also exist.

In the generator, rotor components and stator components are separated by a clearance gap, sometimes referred to as an air gap. A uniform air gap facilitates operation of the generator. During operation, a magnetic field generated by a plurality of permanent magnets or wound coil magnets mounted on the rotor or stator passes through a portion of the air gap defined between the rotor and the stator. A plurality of forces that are at least partially proportional to the magnitude and direction of the magnetic field are induced. These induced forces include, but are not limited to, radial and axial forces across the air gap, and torque forces, such that a plurality of forces are acting on the rotor. Transmission of the magnetic field through the air gap may be at least partly dependent on a magnitude of each of the induced magnetomotive forces (MMF) and a predetermined magnitude of an air gap radial dimension, i.e., the radial distance between a rotor surface and a stator surface. However, asymmetric and/or transient loads on the rotor may be introduced via the blades and/or other mechanisms. Such asymmetric and/or transient loads may sometimes deflect the rotor such that the air gap dimension is reduced and/or altered to be non-uniform.

BRIEF DESCRIPTION OF THE INVENTION

In one aspect, a generator includes at least one rotating member, at least one stationary member, and a clearance gap control system. The stationary member is positioned such that a clearance gap is defined between a portion of the rotating member and a portion of the stationary member. The clearance gap is configured to facilitate transmitting a controllable magnetic flux therethrough. The control system includes at least one clearance gap measurement assembly, at least one power converter, and at least one controller. The controller is coupled in electronic data communication with the assembly and the converter and is configured to modulate a dimension of the gap by modulating the flux.

In another aspect, a method of controlling a clearance gap dimension within a generator is provided. The generator has at least one rotating member and at least one stationary member positioned such that a clearance gap is defined between a portion of the rotating member and a portion of the stationary member. The clearance gap has a measurable dimension. The method includes modulating the clearance gap dimension by modulating a controllable magnetic flux generated within the clearance gap.

In a further aspect, a control system for a rotary machine is provided. The rotary machine includes at least one rotating member and at least one stationary member positioned such that a clearance gap is defined between a portion of the rotating member and a portion of the stationary member. The clearance gap is configured to facilitate transmitting a controllable magnetic flux therethrough. The control system includes at least one clearance gap measurement assembly, at least one power converter, and at least one controller. The controller is coupled in electronic data communication with the assembly and the converter and is configured to modulate the clearance gap measurement by modulating the magnetic flux.

DETAILED DESCRIPTION OF THE INVENTION

Figure 1:
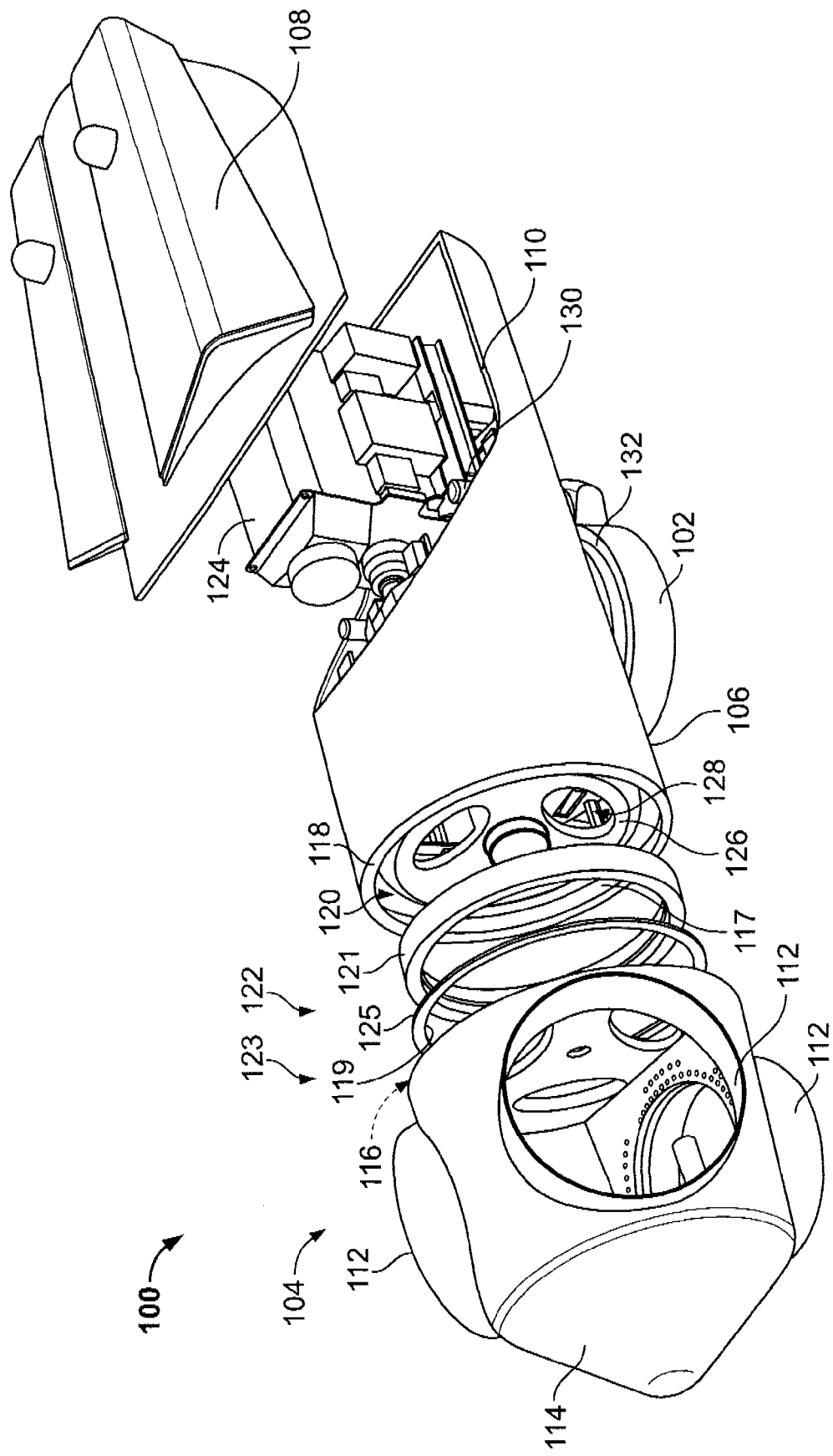
FIG. 1 is an exploded schematic view of an exemplary wind turbine generator.

FIG. 1 is an exploded schematic view of an exemplary wind turbine generator 100. In the exemplary embodiment, wind turbine generator 100 is a horizontal axis wind turbine. Alternatively, wind turbine 100 may be a vertical axis wind turbine. Also, alternatively, wind turbine 100 may be a 1.5 Megawatt (MW)-series or a 2.5 MW-series wind turbine generator commercially available from General Electric Company, Schenectady, N.Y. Further, alternatively, wind turbine 100 may be any wind turbine generator that the invention described herein may be embedded. Wind turbine 100 includes a mounting fixture 102 extending from either a tower or a supporting surface (neither shown in FIG. 1). In the event that a tower is used, a height of the tower is selected based upon factors and conditions known in the art. Wind turbine 100 also includes a hub assembly 104, a shell 106, a cover assembly 108, and a main frame 110. Shell 106 is fixedly coupled to main frame 110 and cover assembly 108 is removably coupled to main frame 110. Hub assembly 104 is removably coupled to shell 106. Hub assembly 104, shell 106, cover assembly 108 and main frame 110 cooperate to facilitate load support and load distribution within wind turbine 100. Cover assembly 108 includes an integrated cooling system (not shown in FIG. 1) that facilitates maintaining wind turbine 100 components within hub 104, shell 106 and cover 108 within predetermined operational temperature parameters.

Hub 104 includes a plurality of blade support sleeves 112 disposed substantially equidistantly circumferentially about hub 104. In the exemplary embodiment, wind turbine 100 has three blade support sleeves 112. Alternatively, hub 104 may have more or less than three blade support sleeves 112. Also, in the exemplary embodiment, sleeves 112 are substantially cylindrical tubes. Alternatively, sleeves 112 may be of any configuration that facilitates predetermined operational parameters of wind turbine 100. Hub 104 also includes a nose element 114 that facilitates an aerodynamic efficiency of wind turbine 100. Hub 104 is coupled to shell 106 via a hub face plate 116 and a frame mating surface 118. A substantially annular interior surface portion 117 of shell 106 and plate 116 at least partially define a cavity 120 when plate 116 and surface 118 are coupled. A main bearing 122 and a support member 123 are positioned within cavity 120. Bearing 122 facilitates radial support and alignment of hub 104 and includes a radially outermost surface 121. Member 123 facilitates support and alignment of bearing 122 within wind turbine 100 and includes a radially inner surface 119 and a radially outer surface 125. Surface 119 is coupled to surface 121 via a friction fit prior to bearing 122 and member 123 positioning within cavity 120. Surface 125 is coupled to surface 117 via a friction fit upon positioning bearing 122 and member 123 within cavity 120.

Wind turbine generator 100 further includes a generator 124 that facilitates converting wind energy as captured by hub assembly 104 and generating electrical energy for subsequent transmission to an electrical distribution system (not shown in FIG. 1). A rotor (not shown in FIG. 1) is rotatably coupled to hub 104 and extends to generator 124. The rotor is coupled to a rotatable exciter (not shown in FIG. 1) that is disposed within generator 124. In the exemplary embodiment, generator 124 is a direct-drive generator, i.e., hub 104 drives generator 124 exciter directly via the rotor. Alternatively, a gearbox (not shown in FIG. 1) is positioned between hub assembly 104 and generator 124 and is used to step up a rotational speed generated by hub 104 to a generator 124 exciter speed that is substantially synchronous.

In the exemplary embodiment, a hub-to-gearbox/hub-to-direct-drive generator connector 126 is also disposed within cavity 120. Connector 126 facilitates radial support and alignment of the rotor from hub 104 to generator 124 (in the exemplary embodiment) or to a gear box (in an alternative embodiment). Connector 126 includes a plurality of passages 128 that facilitate personnel and material transport between hub 104 and the portions of wind turbine 100 defined within shell 106 and cover 108. Some alternative embodiments of wind turbine 100 exclude connector 126.

Blade support sleeves 112 are each configured to receive a blade (not shown in FIG. 1). In the exemplary embodiment, hub 104 receives three rotor blades. In an alternative embodiment, hub 104 receives any number of blades that facilitates attaining predetermined operational parameters of wind turbine 100. The blades are positioned about hub 104 to facilitate rotating hub 104 to transfer kinetic energy from the wind into usable mechanical energy via the rotor, and subsequently, electrical energy within generator 124. The blades may have any length that facilitates wind turbine 100 performing as described herein.

At least one pitch drive mechanism (not shown in FIG. 1) modulates a pitch angle of the blades along a pitch axis (not shown in FIG. 1). As such, the blades may deflect and/or rotate from a neutral, or non-deflected, position to a deflected position and facilitate increasing or decreasing the blades rotational speed by adjusting the surface area of the blades exposed to the wind force vectors, i.e., by adjusting the wind loading on the blades.

Wind turbine 100 also includes a yaw adjustment mechanism 130 that may be used to rotate wind turbine 100 on an axis (not shown in FIG. 1) to control the perspective of wind turbine 100 with respect to the direction of the wind. Mechanism 130 is coupled to main frame 110 and to a yaw bearing 132 and at least one yaw drive gear (not shown in FIG. 1) wherein bearing 132 and the drive gear are coupled to mounting fixture 102. Bearing 132 facilitates support and alignment of wind turbine 100 during yaw adjustment operations.

In some configurations, one or more microcontrollers in a control system (not shown in FIG. 1) are used for overall system monitoring and control including pitch and yaw adjustments, rotor speed regulation, yaw brake application, and fault monitoring. Alternatively, distributed or centralized control architectures are used in alternate embodiments of wind turbine 100.

Figure 2:
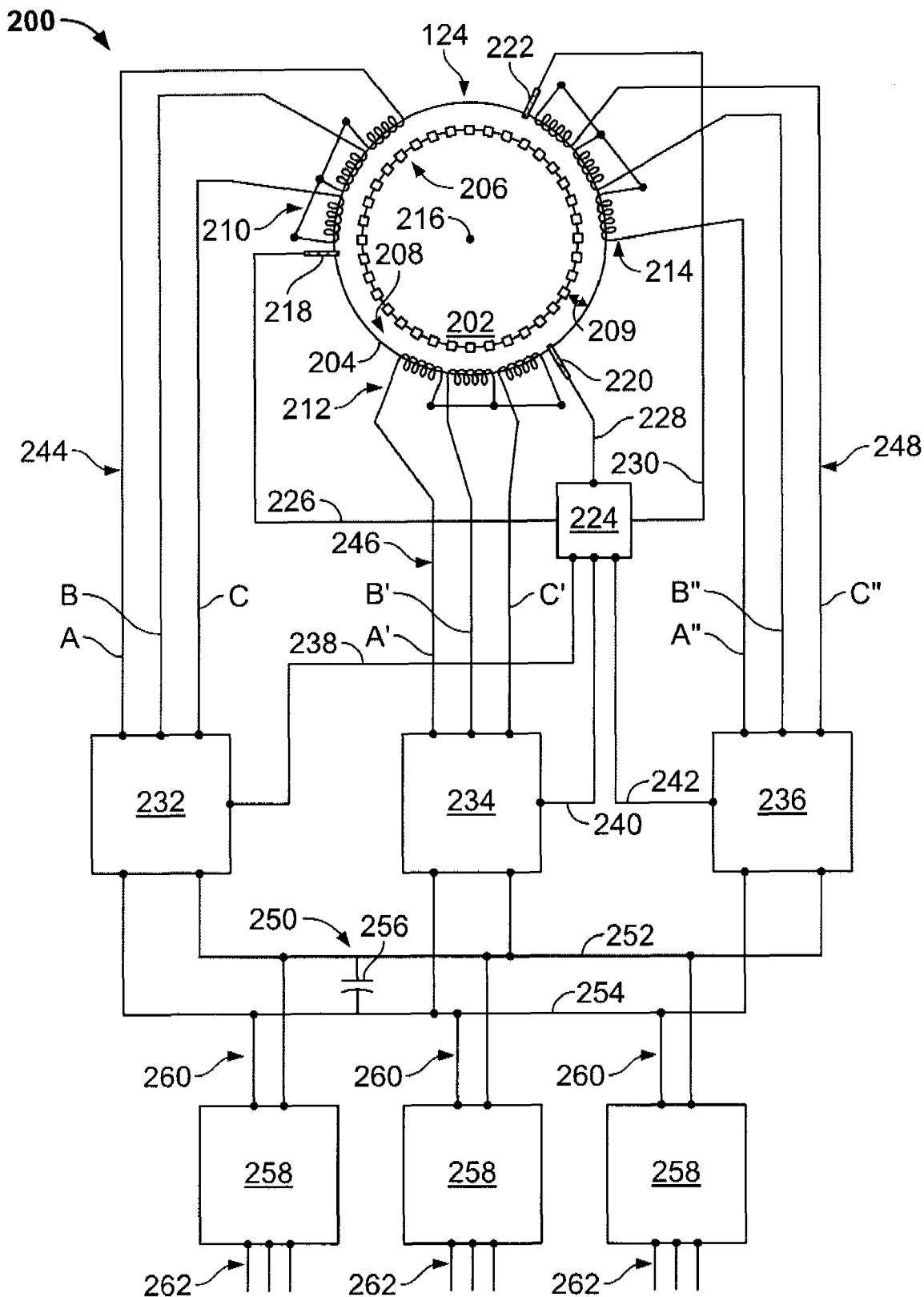
FIG. 2 is a block diagram of an exemplary clearance gap control system that may be used with, but is not limited to being used with, the wind turbine generator shown in FIG. 1.

FIG. 2 is a block diagram of an exemplary clearance gap control system 200 that may be used with, but is not limited to being used with, wind turbine generator 100 (shown in FIG. 1). In the exemplary embodiment, generator 124 is a round rotor, synchronous, three-phase, permanent magnet generator 124 that includes a rotor 202 and a stator 204. However, generator 124 may be any type of generator including, but not limited to, salient pole generators, double-sided stator generators, and/or doubly-fed induction generators. In the exemplary embodiment, rotor 202 includes a plurality of permanent magnets 206 that are coupled to rotor 202. Alternatively, rotor 202 may be a wound rotor wherein the associated windings (neither shown in FIG. 2) are separately-excited, for example, but not limited to, a salient-pole rotor. Rotor 202 and stator 204 are positioned such that a clearance gap 208 (sometimes referred to as an air gap 208) is defined between stator 204 and rotor 202 with a pre-determined clearance gap radial dimension 209 that is substantially circumferentially similar about rotor 202 and stator 204 while rotor 202 is stationary. Permanent magnets 206 with pre-determined polarities are positioned to generate a magnetic field (not shown in FIG. 2) around rotor 202 with a pre-determined number of poles and a pre-determined magnetic strength.

Stator 204 includes a plurality of stator windings 210, 212, and 214. Gap 208 facilitates magnetic coupling of rotor 202 and stator windings 210, 212, and 214 to generate a pre-determined voltage within stator windings 210, 212, and 214 at a pre-determined frequency that is determined by rotor 202 rotational speed as rotor 202 is rotated within stator 204. The generated voltages within stator windings 210, 212, and 214 subsequently generate a pre-determined electric current within windings 210, 212, and 214. The electric currents generated within windings 210, 212, and 214 subsequently generate a plurality of magnetic fields and as the magnetic field generated in rotor 202 rotates, the magnetic field of rotor 202 interacts with the magnetic fields of stator windings 210, 212, and 214 through gap 208. The interaction of the magnetic fields induces magnetomotive axial and radial forces and a torque that act on rotor 202. Loads induced within rotor 202 by asymmetric and/or transient loads introduced via the blades and/or other drive components may shift an axis of rotation of rotor 202 radially away from a nominal generator centerline axis of rotation 216 such that a clearance gap radial dimension 209 is reduced and/or altered to be non-uniform circumferentially within generator 124. Axis of rotation 216 is substantially parallel to a wind turbine 100 axis of rotation. Radial and axial forces induced on rotor 202 by the interaction of the magnetic fields are proportional to the strength and position of the magnetic flux component within gap 208 and is also sometimes substantially uniform about gap 208. As the flux component in gap 208 increases, the radial and axial forces induced on rotor 202 increase, and the attractive force between rotor 202 and stator 204 is increased. Similarly, as the flux component in gap 208 decreases, the radial and axial forces induced on rotor 202 decrease, and the attractive force between rotor 202 and stator 204 is decreased. Therefore, modulating the flux and the radial and axial forces induced on rotor 202 may facilitate decreasing a tendency of rotor 202 axis of rotation to radially shift away from axis of rotation 216 and to facilitate mitigating radial dimension 209 reduction and/or alteration to be non-uniform circumferentially. A predetermined range of radial dimension 209 tolerances may be provided for.

System 200 includes a plurality of clearance gap measurement assemblies 218, 220, and 222 associated with stator windings 210, 212, and 214, respectively. Assemblies 218, 220, and 222 are positioned on a radially inner portion of stator 204. In the exemplary embodiment, assemblies 218, 220, and 222 are proximity apparatus that are configured to measure radial dimension 209 within the vicinity of windings 210, 212, and 214, respectively. Alternatively, assemblies 218, 220, and 222 are flux measurement apparatus configured to measure a magnetic flux within the vicinity of windings 210, 212, and 214, respectively. In some embodiments, assemblies 218, 220, and 222 are each configured to measure both dimension 209 and the associated magnetic flux. Although three measurement assemblies are discussed and illustrated hereon, any number of measurement assemblies with any apparatus in any configuration may be used with control system 200, whether such number is described and/or illustrated hereon.

Assemblies 218, 220, and 222 are coupled in electronic data communication with at least one controller 224 via a plurality of sensor cables 226, 228 and 230, respectively. In the exemplary embodiment, sensor cables 226, 228 and 230 define a plurality of controller input channels 226, 228 and 230. In additional or alternatively, a network of transmitters and receivers operating in the radio frequency (RF) band may be used to define controller input channels 226, 228 and/or 230.

Controller 224 includes at least one processor and a memory, at least one processor input channel, at least one processor output channel, and may include at least one computer (none shown in FIG. 2).

As used herein, the term computer is not limited to just those integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, a floppy disk, a compact disc-read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but not be limited to, computer peripherals associated with an operator interface such as a mouse and a keyboard (neither shown in FIG. 2). Alternatively, other computer peripherals may also be used that may include, for example, but not be limited to, a scanner (not shown in FIG. 2). Furthermore, in the exemplary embodiment, additional output channels may include, but not be limited to, an operator interface monitor (not shown in FIG. 2).

Processors for controller 224 process information, including clearance gap dimension 209 signals and/or clearance gap magnetic flux signals from assemblies 218, 220, and 222 via controller input channels 226, 228 and 230, respectively. RAM and storage device store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Controller 224 is coupled in electronic data communication with a plurality of generator power converters 232, 234 and 236 via controller output channels 238, 240, and 242, respectively. In the exemplary embodiment, output channels 238, 240, and 242 are cables 238, 240, and 242, respectively. In addition or alternatively, a network of transmitters and receivers operating in a predetermined portion of a radio frequency (RF) band may be used to define output channels 238, 240, and/or 242.

Stator windings 210, 212, and 214 are coupled in electric connection with converters 232, 234, and 236, respectively, via electricity conduits 244, 246, and 248, respectively. In the exemplary embodiment, conduits 244, 246, and 248 are a plurality of electrical cables 244, 246, and 248 that are configured to transmit pre-determined electric power at pre-determined currents, voltages and frequencies that are generated by generator 124. In addition or alternatively, conduits 244, 246, and/or 248 are any electric power transmission device that includes, but is not limited to, bus bars and cables.

Specifically, in the exemplary embodiment, each of plurality of cables 244, 246, and 248 include at least one cable for each of three phases associated with generator 124. Alternatively, any number of phases may be associated with generator 124 that facilitates operation of generator 124 as described herein. More specifically, cable 244 includes a cable each for an A-phase, B-phase, and C-phase labeled A, B, and C, respectively. Similarly, cable 246 includes a cable each for the A-phase, B-phase, and C-phase labeled A', B', and C', respectively. Moreover, similarly, cable 248 includes a cable each for the A-phase, B-phase, and C-phase labeled A", B", and C", respectively.

Converters 232, 234, and 236 convert the alternating current (AC) signals transmitted from stator 204 into direct current (DC) signals by AC rectification. Moreover, in the exemplary embodiment, converters 232, 234, and 236 are coupled in electrical communication with a single direct current (DC) link 250. Alternatively, converters 232, 234, and 236 are coupled in electrical communication with individual and separate DC links (not shown in FIG. 2). DC link 250 includes a positive rail 252, a negative rail 254, and at least one capacitor 256 coupled therebetween. In the exemplary embodiment, capacitor 256 facilitates mitigating DC link 250 voltage variations by facilitating mitigation of a DC ripple sometimes associated with three-phase AC rectification. Alternatively, capacitor 256 is one or more capacitors configured in series or in parallel between rails 252 and 254.

Control system 200 further includes a plurality of grid power converters 258 that are coupled in electrical communication with DC link 250 by a plurality of positive and negative conduits 260. In the exemplary embodiment, there are three grid power converters 258 and three sets of conduits 260. However, any number of converters 258 and conduits 260 may be used, whether such number is described and/or illustrated hereon. Also, in the exemplary embodiment, conduits 260 are any electric power transmission device that includes, but is not limited to, bus bars and cables. In the exemplary embodiment, converters 258 are inverters that convert the DC electricity from DC link 250 to three-phase AC with pre-determined voltages, currents, and frequencies and are controlled by a controller (not shown in FIG. 3) similar to controller 224. Specifically, in the exemplary embodiment, converters 258 are configured to transmit 60 Hz three-phase AC to an electrical power grid (not shown in FIG. 3) via a plurality of grid conduits 262. However, converters 258 may be configured to transmit AC electrical power at any frequency, whether such frequency is described and/or illustrated hereon. Conduits 262 may be any electric power transmission device that includes, but is not limited to, bus bars and cables.

Figure 3:
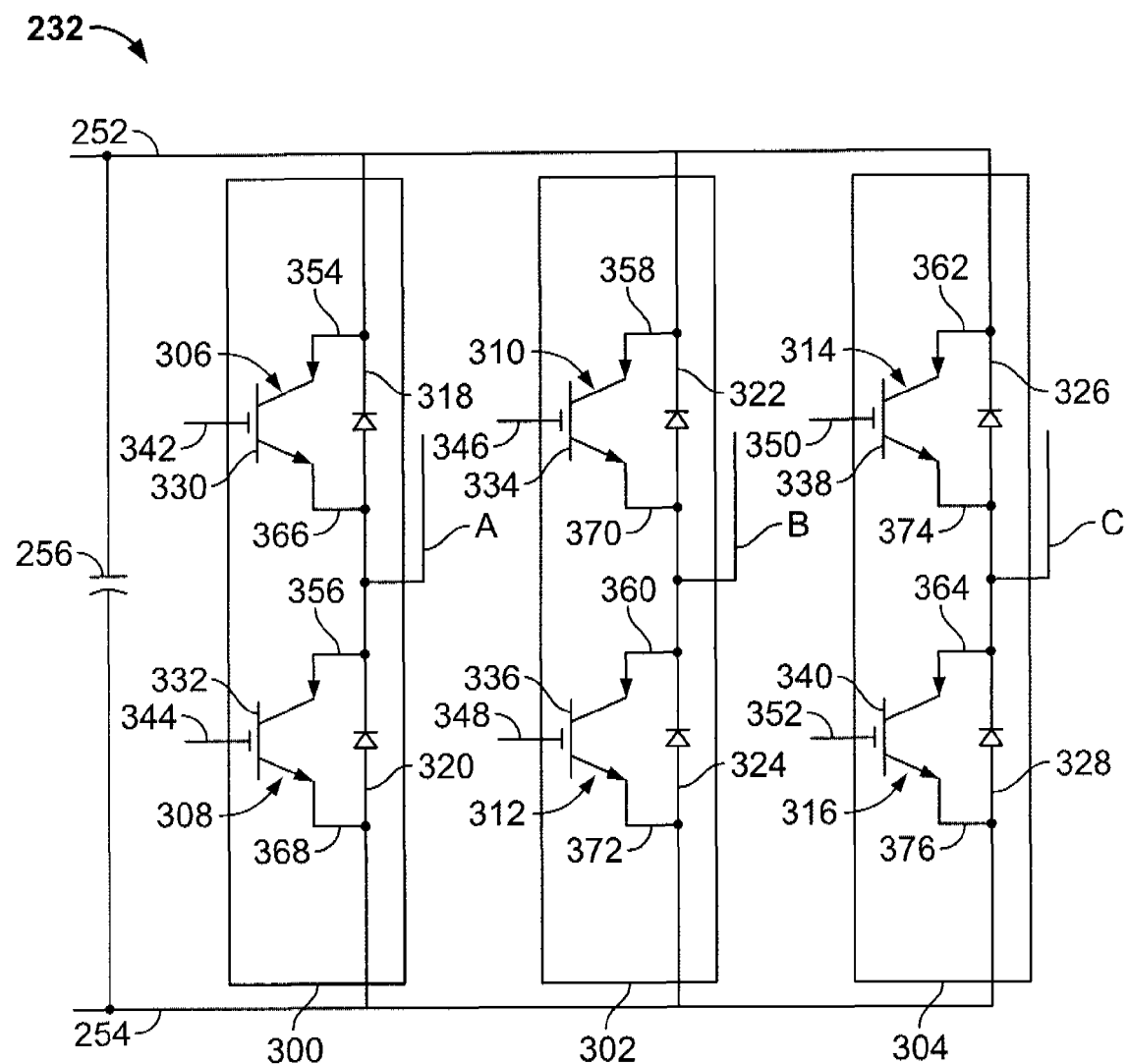
FIG. 3 is a schematic view of an exemplary generator power converter that may be used with, but is not limited to being used with, the clearance gap control system shown in FIG. 2.

FIG. 3 is a schematic view of an exemplary generator power converter 232 that may be used with, but is not limited to being used with, clearance gap control system 200 (shown in FIG. 2). Converters 234 and 236 are substantially identical. Capacitor 256 is illustrated for perspective. A plurality of switching devices is provided in connection with each of phase cables A, B, and C of stator output cables 244 (shown in FIG. 2), each cable corresponding to each of the three phases of the electrical output power from stator windings 210 (shown in FIG. 2). Specifically, a first switching module 300, a second switching module 302 and a third switching module 304 are provided, each corresponding to a different phase of power output generated by stator windings 210. Each of switching modules 300, 302 and 304 include a pair of switching devices. More specifically, in the exemplary embodiment, first switching module 300 includes a first switching device 306 and a second switching device 308; second switching module 302 includes a third switching device 310 and a fourth switching device 312; and third switching module 304 includes a fifth switching device 314 and a six switching device 316.

Converter 232 uses pulse width modulation (PWM) methods to control stator windings 210 output current. In the exemplary embodiment, each of switching devices 306-316 is an insulated gate bipolar transistor (IGBT) switching device 306-316 and includes a corresponding diode 318, 320, 322, 324, 326 and 328, respectively. Alternatively, switching devices 306-316 may include, but not be limited to, a plurality of integrated gate commutated thyristors (IGCTs) and a plurality of thyristors (neither shown in FIG. 3). Further, alternatively, any type of switching device that facilitates operation of system 200 as described herein may be used. Switching devices 306-316 are configured such that a gate 330, 332, 334, 336, 338, and 340 of each of switching devices 306-316 is coupled in electronic data communication with a control line 342, 344, 346, 348, 350, and 352, respectively, and diodes 318-328 are connected between a plurality of collectors 354, 356, 358, 360, 362, and 364 and a plurality of emitters 366, 368, 370, 372, 374, and 376 of switching devices 306-316, respectively. Switching, or modulating, of switching devices 306-316 is controlled by a controller 224 output signal (not shown in FIG. 3) transmitted to gates 330-340 of switching devices 306-316, respectively. In the exemplary embodiment, the controller output signals are transmitted from controller 224 (shown in FIG. 2) via controller output cable 238 (shown in FIG. 2). Specifically, cable 238 includes lines 342-352. Phase cable A is coupled in electrical communication with first switching module 300 between emitter 366 of first switching device 306 and collector 356 of second switching device 308. Phase cables B and C are coupled in electrical communication with second and third switching modules 302 and 304 in a substantially similar manner.

Collectors 354, 358, and 360 of first, third and fifth switching devices 318, 322, and 326, respectively, are connected to positive rail 252 of DC link 250 (shown in FIG. 3). Emitters 368, 372, and 376 of second, fourth, and sixth switching devices 308, 312 and 316, respectively are connected to negative rail 254 of DC link 250. Rail 252 is maintained at a positive capacitive voltage and rail 254 is maintained at a zero capacitive voltage, both capacitive voltages being referenced to negative rail 254.

A method of controlling clearance gap dimension 209 within generator 124, generator 124 having at least one rotating member 202 and at least one stationary member 204 positioned such that clearance gap 208 is defined between a portion of rotating member 202 and a portion of stationary member 204, includes modulating clearance gap dimension 209 by modulating a controllable magnetic flux generated within clearance gap 208.

FIGS. 2 and 3 are referenced together for the operational discussion of control system 200. During operation, for example, in the event that some wind forces are such that the blades tend to be positioned to a deflected position, torsional loads and subsequent stresses may be induced within the blades. These stresses are transferred from the blades to hub 104. The transferred stresses within hub 104 are transferred to rotor 202. In some instances, stresses transferred into rotor 202 may deflect rotor 202 such that rotor 202 radial position may be within the tolerances of bearing 118 such that dimension 209 of gap 208 is altered and predetermined gap dimension 209 tolerances are approached. Assemblies 218, 220, and 222 monitor dimensions 209 of and/or the magnetic flux of gap 208 and transmit the associated clearance gap radial dimension signals, or gap dimension signals, and/or clearance gap magnetic flux signals, or flux signals, (neither shown in FIGS. 2 and 3) to controller 224 by controller input channels 226, 228, and 230, respectively. The gap dimension and/or the flux signals are voltage or electrical current signals converted to dimension measurements and/or magnetic flux measurements by at least one resident conversion algorithm within the at least one processor of controller 224.

The processor of controller 224 generates internal processor clearance gap dimension measurement and/or flux measurement signals and uses at least one resident control algorithm to compare these dimension and/or flux measurements to at least one predetermined clearance gap dimension and/or predetermined flux measurement, or a range thereof (neither shown in FIGS. 2 and 3). If any deviations are determined, the processor generates internal processor clearance gap dimension and/or flux adjustment signals (not shown in FIGS. 2 and 3) that is converted to processor output signals (not shown in FIGS. 2 and 3) by at least one resident clearance gap dimension and/or flux adjustment algorithm. The processor output signals are transmitted as controller output signals via output channels 238, 240, and 242 to converters 232, 234, and 236, respectively. Operation of converter 232 is discussed further below. Converters 234 and 236 operate in a substantially similar manner. The controller output signals are transmitted to switching devices 306-316 and are switched in a PWM manner to control the frequency, the phase angle and the amplitude of the voltage and current (and, therefore, power) signals received from stator windings 210 and are subsequently converted and transmitted to DC link 250.

In the exemplary embodiment, control system 200 is configured to allow controller 224 to control converters 232, 234, and 236 independently. Specifically, in the event that rotor 202 is deflected such that gap dimension 209 is smaller at windings 210 than dimension 209 at windings 212 and 214, controller 224 will transmit signals to converter 232 to decrease the radial air gap flux generated at windings 210. A decrease in radial air gap flux generated within a set of windings, for example windings 210, facilitates a decrease in radial force induced on rotor 202 in the vicinity of windings 210. Moreover, in this example, controller 224 will transmit signals to converters 234 and 236 to increase the radial air gap flux generated at windings 212 and 214, which thereby facilitates an increase in the radial force induced on rotor 202 in the vicinity of windings 212 and 214. The overall effect is to alter the attractive forces induced within generator 124 between rotor 202 and stator 204 to reposition rotor 202 such that gap dimensions measured by assemblies 218, 220, and 222 are substantially similar.

Similarly, in the event that rotor 202 is deflected such that gap dimension 209 is greater at windings 210 than dimension 209 at windings 212 and 214, controller 224 will transmit signals to converter 232 to increase the radial air gap flux generated at windings 210. An increase in the radial air gap flux generated within a set of windings, for example windings 210, facilitates an increase in the radial force induced on rotor 202 in the vicinity of windings 210. Moreover, in this example, controller 224 will transmit signals to converters 234 and 236 to decrease the radial air gap flux generated at windings 212 and 214, which thereby facilitates a decrease in radial force induced on rotor 202 in the vicinity of windings 212 and 214. The overall effect is to alter the attractive forces induced within generator 124 between rotor 202 and stator 204 to reposition rotor 202 such that gap dimensions measured by assemblies 218, 220, and 222 are substantially similar.

During the transients as described above, assemblies 218, 220, and 222 continue to transmit associated gap dimension 209 and/or flux measurement signals at a pre-determined update rate. As rotor 202 is repositioned, controller 224 receives the associated gap dimension 209 and/or flux measurement signals and the processor of controller 224 facilitates the modulation of the magnitude and duration of the controller output signals transmitted to converters 232, 234, and 236. Moreover, to attain a pre-determined rate of rotor 202 repositioning, controller 224 again facilitates the modulation of the magnitude and duration of the controller output signals transmitted to converters 232, 234, and 236. Upon dimension 209 of gap 208 being changed to a predetermined parameter or within a range of predetermined parameters as sensed by assemblies 218, 220, and 222, control system 200 facilitates maintaining gap dimension 209 at a predetermined parameter or within a range of predetermined parameters within generator 124 (shown in FIG. 1).

The gap dimension 209 and/or magnetic flux signals as sensed and transmitted by assemblies 218, 220, and 222 may be used by either control system 200 or another control system to modulate other wind turbine 100 operational parameters including, but not being limited to, yaw and blade pitch orientations about the associated axis.

Figure 4:
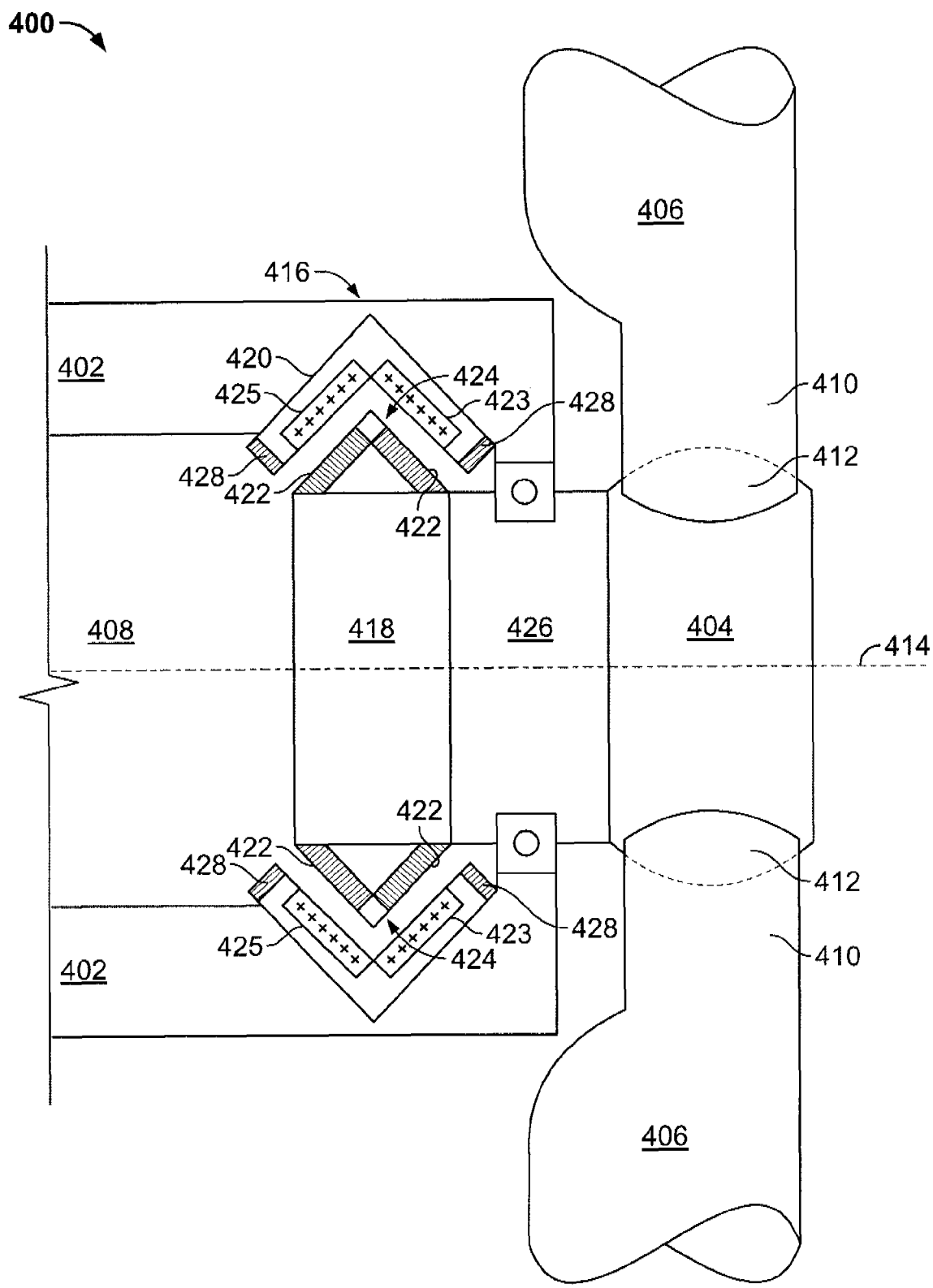
FIG. 4 is a schematic view of another exemplary wind turbine generator into which the clearance gap control system shown in FIG. 2 may be embedded.

FIG. 4 is a schematic view of another exemplary wind turbine generator 400 into which clearance gap control system 200 (shown in FIG. 2) may be embedded. Wind turbine generator 400 is a horizontal axis wind turbine. Alternatively, wind turbine 400 may be a vertical axis wind turbine. Wind turbine 400 includes a support frame 402 that is fixedly coupled to a tower extending from a supporting surface (neither shown in FIG. 4). Wind turbine 400 also includes a rotatable hub/rotor 404 and a plurality of rotor blades 406 coupled to hub/rotor 404. In this alternative embodiment, wind turbine 400 has three rotor blades 406 (only two shown in FIG. 4) coupled to hub/rotor 404. However, wind turbine 400 may have any number of rotor blades 406, whether such number is described and/or illustrated hereon. In the embodiment of FIG. 4, support frame 402 is includes a substantially annular cavity 408. The height of the tower is selected based upon factors and conditions known in the art.

Blades 406 are positioned about hub/rotor 404 to facilitate rotating hub/rotor 404 to transfer kinetic energy from the wind into usable mechanical energy, and subsequently, electrical energy. Blades 406 are mated to hub/rotor 404 by coupling a blade root portion 410 to hub/rotor 404 at a plurality of load transfer regions 412. Load transfer regions 412 have a hub/rotor load transfer region and a blade load transfer region (both not shown in FIG. 4). Loads induced in blades 406 are transferred to hub/rotor 404 via load transfer regions 412.

In the embodiment of FIG. 4, blades 406 may each have any suitable length, whether such length is described and/or illustrated hereon. As the wind strikes blades 406, hub/rotor 404 is rotated about rotation axis 414. As blades 406 are rotated and subjected to centrifugal forces, blades 406 are subjected to various bending moments and other operational stresses. As such, blades 406 may deflect and/or rotate from a neutral, or non-deflected, position to a deflected position and associated stresses, or loads, may be induced in blades 406. Moreover, a pitch angle (not shown in FIG. 4) of blades 406, i.e., the angle that determines blades 406 perspective with respect to the direction of the wind, may be changed by a pitch adjustment mechanism (not shown in FIG. 4) to facilitate increasing or decreasing blade 406 speed by adjusting the surface area of blades 406 exposed to the wind force vectors. In this alternative embodiment, the pitches of blades 406 are controlled individually. Alternatively, blades 406 pitch may be controlled as a group.

In some configurations, one or more microcontrollers in a control system (not shown in FIG. 4) are used for overall system monitoring and control such as, but not limited to, pitch and rotor speed regulation, yaw drive and yaw brake application, and fault monitoring. Alternatively, distributed or centralized control architectures are used in alternate embodiments of wind turbine 400.

In the embodiment of FIG. 4, various components of wind turbine 400 are housed within support frame cavity 408. Hub/rotor 404 is rotatably coupled to an electric generator 416. Also, in the embodiment of FIG. 4, generator 416 is a V-shaped, synchronous, three-phase, permanent magnet generator 416 that includes a rotor 418 and a stator 420. Alternatively, generator 416 is any type of generator including, but not limited to, salient pole generators, double-sided stator generators, and/or doubly-fed induction generators. In the embodiment of FIG. 4, rotor 418 is an extension of hub/rotor 404. Alternatively, rotor 404 may be a separate component rotatingly coupled to hub/rotor 404 using methods known in the art. In this alternative embodiment, rotor 418 includes a plurality of permanent magnets 422 that are coupled to rotor 418. Alternatively, rotor 418 may be a wound rotor wherein the associated windings (neither shown in FIG. 4) are separately-excited, for example, but not limited to, a salient-pole rotor. Rotor 418 and stator 420 are positioned such that a clearance gap 424 (sometimes referred to as an air gap 424) is defined between stator 420 and rotor 418 with a pre-determined clearance gap radial dimension (not shown in FIG. 4) that is substantially circumferentially similar about rotor 418 and stator 420 while rotor 418 is stationary. Permanent magnets 422 with pre-determined polarities are positioned to generate a magnetic field (not shown in FIG. 4) around a periphery of rotor 418 with a pre-determined number of poles and a pre-determined magnetic strength.

In the embodiment of FIG. 4, stator 420 at least partially encloses rotor 418 and rotor 418 rotates radially inward of stator 420. Alternatively, rotor 418 is positioned radially outward of stator 420 such that rotor 418 at least partially encloses stator 420 and rotor 418 rotates radially outward of stator 420.

In the exemplary embodiment, stator 420 includes a plurality of three-phase forward stator windings 423 and a plurality of three-phase aft stator windings 425. Windings 423 and 425 are substantially similar and are substantially electrically isolated from each other. Moreover, windings 424 and 425 are each electrically coupled to converters 232, 234 and 236 (all three shown in FIG. 2) such that each of windings 423 and 425 may be controlled independently. Alternatively, windings 423 and 425 are manufactured as a single set of three-phase windings as is known in the art. The "v-shaped" configuration of generator 416 facilitates operation of wind turbine generator 400 as discussed further below.

Gap 424 facilitates magnetic coupling of permanent magnets 422 and windings 423 and 425 to generate pre-determined voltages within windings 423 and 425 at a pre-determined frequency that is determined by rotor 418 rotational speed as rotor 418 is rotated within stator 420. The generated voltages within windings 423 and 425 subsequently generate pre-determined electric currents within windings 423 and 425. The electric currents generated within windings 423 and 425 subsequently generate a plurality of stator magnetic fields (not shown). As the magnetic field (not shown) generated via rotor 418 rotates, the magnetic field of rotor 418 interacts with the magnetic fields of windings 423 and 425 through gap 424. The interaction of the magnetic fields induces a torque on rotor 418. Loads induced within rotor 418 by asymmetric and/or transient loads introduced via blades 406 or other drive components may shift an axis of rotation of rotor 418 radially away from nominal wind turbine centerline axis of rotation 414 such that the clearance gap 424 dimension is reduced and/or altered to be non-uniform circumferentially within generator 416. The radial and axial forces induced on rotor 418 by the interaction of the magnetic fields are proportional to the strength and position of the magnetic flux components within gap 424. Such radial and axial forces may be substantially uniform about gap 424, or alternatively, may be non-symmetrical with respect to windings 423 and 425. As the flux at any point within gap 424 increases, the associated radial and axial forces induced on rotor 418 in the vicinity of such point within gap 424 increases, and the attractive force between rotor 418 and stator 420 is increased in the vicinity of such point. Similarly, as the flux at any point in gap 424 decreases, the radial and axial forces induced on rotor 418 in the vicinity of such point within gap 424 decreases, and the attractive force between rotor 418 and stator 420 is decreased in the vicinity of such point. Therefore, modulating the flux and the radial and axial forces induced on rotor 418 via the interaction of the stator and rotor magnetic fields may facilitate decreasing a tendency of rotor 418 axis of rotation to radially shift away from axis of rotation 414 and to facilitate mitigating gap 424 dimension reduction and/or alteration to be non-uniform circumferentially. A pre-determined range of gap 424 dimension tolerances are provided for. Moreover, the interaction of the magnetic fields of windings 423 and rotor 418 separately from the interaction of magnetic fields of winding 425 and rotor 418 facilitates separately modulating the flux and the radial and axial forces induced on rotor 418 via a forward portion of gap 424 and an aft portion of gap 424. Separately controlling the forward and aft flux and radial and axial forces in this manner further facilitates decreasing a tendency of rotor 418 axis of rotation to radially shift away from axis of rotation 414 as well as facilitates mitigating axial thrust induced on rotor 418.

Wind turbine 400 also includes a support bearing 426 that provides radial support of hub/rotor 404, generator rotor 418, and blades 406. In the embodiment of FIG. 4, bearing 426 is, but is not limited to, either a roller ball bearing and/or a journal bearing. Bearing 426 may also be configured to provided axial, or thrust, support. Wind turbine 400 further includes a clearance gap control system (not shown in FIG. 4) that is substantially similar to system 200 (shown in FIG. 2) with the exception of the positioning of a plurality of clearance gap measurement assemblies 428. Assemblies 428 are positioned on an axially forward-most and aft-most surface of stator 420. In the embodiment of FIG. 4, assemblies 428 are substantially similar to assemblies 218, 220, and 222 (shown in FIG. 2).

During operation, rotation of hub/rotor 404 rotatably drives generator rotor 418 and rotor 418 rotation facilitates generator 416 production of electrical power. For example, in the event that some wind forces are such that blades 406 tend to be positioned to a deflected position, torsional loads and subsequent stresses may be induced within blades 406. These stresses are transferred from blades 406 to hub/rotor 404 via load transfer regions 412. The transferred stresses within hub/rotor 404 are transferred to rotor 418 and bearing 426. In some instances, stresses transferred into hub/rotor 404 may deflect hub/rotor 404 and rotor 418 such that hub/rotor 404 and rotor 418 radial positions may be within the tolerances of bearing 426 such that gap 424 dimension is altered and pre-determined radial and axial gap 424 dimension tolerances are approached. Assemblies 428 monitor gap 424 dimensions of and/or the magnetic flux of gap 424 and transmit the associated clearance gap radial dimension signals, or gap dimension signals, and/or clearance gap magnetic flux signals, or flux signals, (neither shown in FIG. 4) to the control system (not shown in FIG. 4).

The control system operates in a PWM manner to control the frequency, the phase angle and the amplitude of the voltage and current (and, therefore, power) signals generated in, and transmitted from, windings 423 and 425. Specifically, in the event that rotor 418 is deflected such that gap 424 dimension is not uniform within generator 416, the associated radial air gap flux in gap 424 is adjusted. The overall effect is to adjust the attractive forces induced within generator 416 between rotor 418 and windings 423 and 425 to reposition rotor 418 such that gap 424 dimensions measured by assemblies 428 are substantially similar. In this manner, generator 416 in conjunction with the associated clearance gap control system, cooperates with bearing 426 to provide radial support and axial positioning of rotor 418 and hub/rotor 404.

Figure 5:
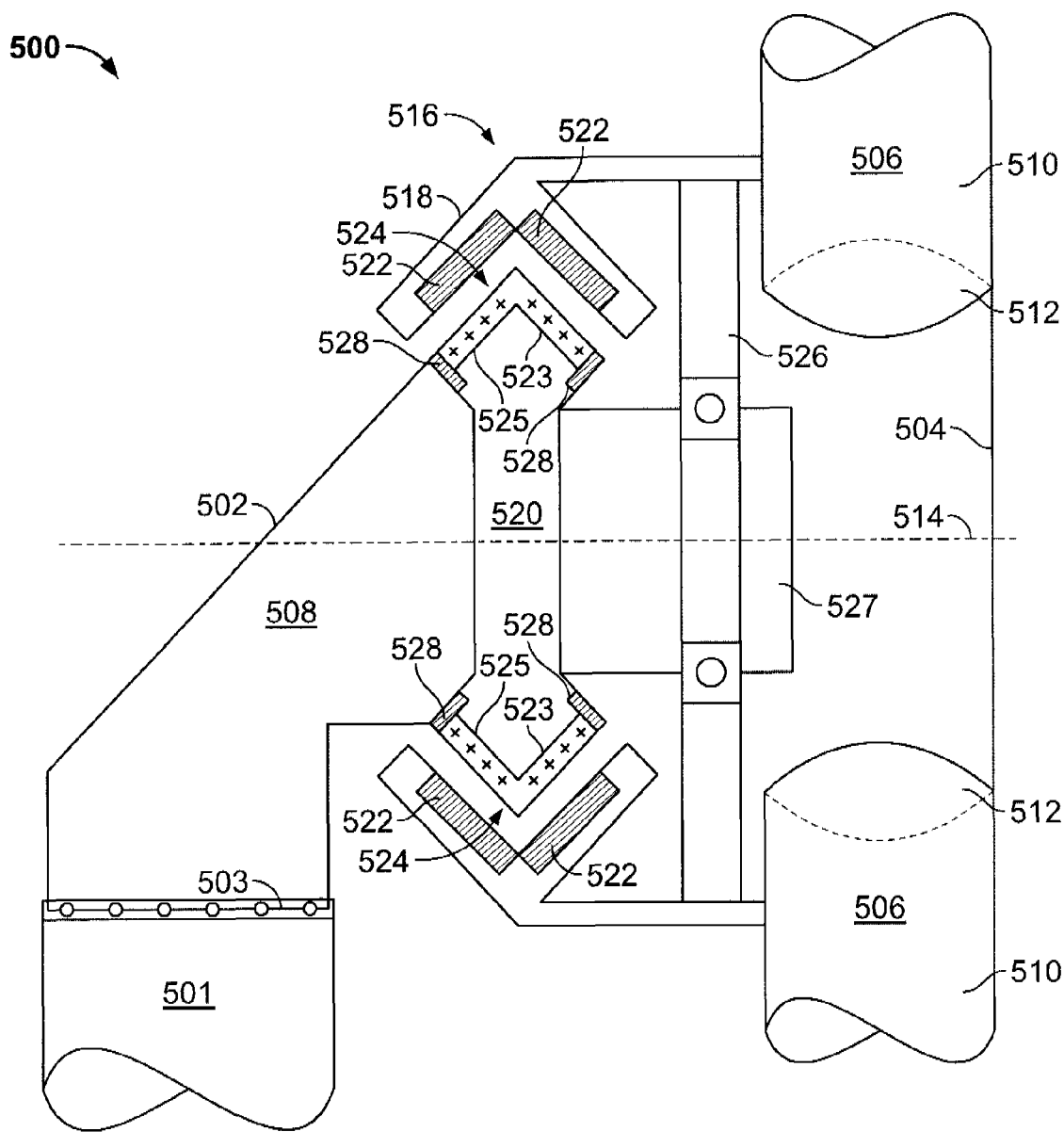
FIG. 5 is a schematic view of another exemplary wind turbine generator into which the clearance gap control system shown in FIG. 2 may be embedded.

FIG. 5 is a schematic view of another exemplary wind turbine generator 500 into which clearance gap control system 200 (shown in FIG. 2) may be embedded. Wind turbine generator 500 is a horizontal axis wind turbine. Alternatively, wind turbine 500 may be a vertical axis wind turbine. Wind turbine 500 includes a support frame 502 that is fixedly coupled to a tower 501 extending from a supporting surface (not shown in FIG. 5) via a yaw bearing 503. Wind turbine 500 also includes a rotatable hub/rotor 504 and a plurality of rotor blades 506 coupled to hub/rotor 504. In this alternative embodiment, wind turbine 500 has three rotor blades 506 (only two shown in FIG. 5) coupled to hub/rotor 504. However, wind turbine 500 may have any number of rotor blades 506, whether such number is described and/or illustrated hereon. In the embodiment of FIG. 5, support frame 502 includes a substantially annular cavity 508. The height of the tower is selected based upon factors and conditions known in the art.

Blades 506 are positioned about hub/rotor 504 to facilitate rotating hub/rotor 504 to transfer kinetic energy from the wind into usable mechanical energy, and subsequently, electrical energy. Blades 506 are mated to hub/rotor 504 by coupling a blade root portion 510 to hub/rotor 504 at a plurality of load transfer regions 512. Load transfer regions 512 have a hub/rotor load transfer region and a blade load transfer region (both not shown in FIG. 5). Loads induced in blades 506 are transferred to hub/rotor 504 via load transfer regions 512.

In the embodiment of FIG. 5, blades 506 may each have any suitable length, whether such length is described and/or illustrated hereon. As the wind strikes blades 506, hub/rotor 504 is rotated about rotation axis 514. As blades 506 are rotated and subjected to centrifugal forces, blades 506 are subjected to various bending moments and other operational stresses. As such, blades 506 may deflect and/or rotate from a neutral, or non-deflected, position to a deflected position and associated stresses, or loads, may be induced in blades 506. Moreover, a pitch angle (not shown in FIG. 5) of blades 506, i.e., the angle that determines blades 506 perspective with respect to the direction of the wind, may be changed by a pitch adjustment mechanism (not shown in FIG. 5) to facilitate increasing or decreasing blade 506 speed by adjusting the surface area of blades 506 exposed to the wind force vectors. In the embodiment of FIG. 5, the pitches of blades 506 are controlled individually. Alternatively, blades 506 pitch may be controlled as a group.

In some configurations, one or more microcontrollers in a control system (not shown in FIG. 5) are used for overall system monitoring and control such as, but not limited to pitch and rotor speed regulation, yaw drive and yaw brake application, and fault monitoring. Alternatively, distributed or centralized control architectures are used in alternate embodiments of wind turbine 500.

In this alternative embodiment, various components of wind turbine 500 are housed within support frame cavity 508. Hub/rotor 504 is rotatably coupled to an electric generator 516. Also, in this alternative embodiment, generator 516 is a V-shaped, synchronous, three-phase, permanent magnet generator 516 that includes a rotor 518 and a stator 520. Alternatively, generator 516 is any type of generator including, but not limited to, salient pole generators, double-sided stator generators, and/or doubly-fed induction generators. In the embodiment of FIG. 5, rotor 518 is an extension of hub/rotor 504. Alternatively, rotor 504 may be a separate component rotatingly coupled to hub/rotor 504 using methods known in the art. In the embodiment of FIG. 5, rotor 518 includes a plurality of permanent magnets 522 that are coupled to rotor 518. Alternatively, rotor 518 may be a wound rotor wherein the associated windings (neither shown in FIG. 5) are separately-excited. Rotor 518 and stator 520 are positioned such that a clearance gap 524 (sometimes referred to as an air gap 524) is defined between stator 520 and rotor 518 with a pre-determined clearance gap radial dimension (not shown in FIG. 5) that is substantially circumferentially similar about rotor 518 and stator 520 while rotor 518 is stationary. Permanent magnets 522 with pre-determined polarities are positioned to generate a magnetic field (not shown in FIG. 5) around an inner periphery of rotor 518 with a pre-determined number of poles and a pre-determined magnetic strength.

In the embodiment of FIG. 5, rotor 518 at least partially encloses stator 520 and rotor 518 rotates radially outward of stator 520. Alternatively, stator 520 is positioned radially outward of rotor 518 such that stator 520 at least partially encloses rotor 518 and rotor 518 rotates radially inward of stator 520.

In the exemplary embodiment, stator 520 includes a plurality of three-phase forward stator windings 523 and a plurality of three-phase aft stator windings 525. Windings 523 and 525 are substantially similar and are substantially electrically isolated from each other. Moreover, windings 524 and 525 are each electrically coupled to converters 232, 234 and 236 (all three shown in FIG. 2) such that each of windings 523 and 525 may be controlled independently. Alternatively, windings 523 and 525 are manufactured as a single set of three-phase windings as is known in the art. The "v-shaped" configuration of generator 516 facilitates operation of wind turbine generator 500 as discussed further below.

Gap 524 facilitates magnetic coupling of permanent magnets 522 and windings 523 and 525 to generate pre-determined voltages within windings 523 and 525 at a pre-determined frequency that is determined by rotor 518 rotational speed as rotor 518 is rotated about stator 520. The generated voltages within windings 523 and 525 subsequently generate pre-determined electric currents within windings 523 and 525. The electric currents generated within windings 523 and 525 subsequently generate a plurality of stator magnetic fields (not shown). As the magnetic field (not shown) generated via rotor 518 rotates, the magnetic field of rotor 518 interacts with the magnetic fields of windings 523 and 525 through gap 524. The interaction of the magnetic fields induces a torque on rotor 518. Loads induced within rotor 518 by asymmetric and/or transient loads introduced via blades 506 or other drive components may shift an axis of rotation of rotor 518 radially away from nominal wind turbine centerline axis of rotation 514 such that the clearance gap 524 dimension is reduced and/or altered to be non-uniform circumferentially within generator 516. The radial and axial forces induced on rotor 518 by the interaction of the magnetic fields are proportional to the strength and position of the magnetic flux components within gap 524. Such radial and axial forces may be substantially uniform about gap 524, or alternatively, may be non-symmetrical with respect to windings 523 and 525. As the flux at any point within gap 524 increases, the associated radial and axial forces induced on rotor 518 in the vicinity of such point within gap 524 increases, and the attractive force between rotor 518 and stator 520 is increased in the vicinity of such point. Similarly, as the flux at any point in gap 524 decreases, the radial and axial forces induced on rotor 518 in the vicinity of such point within gap 524 decreases, and the attractive force between rotor 518 and stator 520 is decreased in the vicinity of such point. Therefore, modulating the flux and the radial and axial forces induced on rotor 518 via the interaction of the stator and rotor magnetic fields may facilitate decreasing a tendency of rotor 518 axis of rotation to radially shift away from axis of rotation 514 and to facilitate mitigating gap 524 dimension reduction and/or alteration to be non-uniform circumferentially. A pre-determined range of gap 524 dimension tolerances are provided for. Moreover, the interaction of the magnetic fields of windings 523 and rotor 518 separately from the interaction of magnetic fields of winding 525 and rotor 518 facilitates separately modulating the flux and the radial and axial forces induced on rotor 518 via a forward portion of gap 524 and an aft portion of gap 524. Separately controlling the forward and aft flux and radial and axial forces in this manner further facilitates decreasing a tendency of rotor 518 axis of rotation to radially shift away from axis of rotation 514 as well as facilitates mitigating axial thrust induced on rotor 518.

Wind turbine 500 also includes a support bearing 526 that is coupled to a support frame extension 527 via methods that include, but are not limited to, friction fit. Bearing 526 extends toward and is coupled to hub/rotor 504 via methods that include, but are not limited to, friction fit. Bearing 526 provides radial support of hub/rotor 505, generator rotor 518, and blades 506. In the embodiment of FIG. 5, bearing 526 is, but is not limited to, either a roller ball bearing and/or a journal bearing. Bearing 526 may also be configured to provide axial, or thrust, support. Wind turbine 500 further includes a clearance gap control system (not shown in FIG. 5) that is substantially similar to system 200 (shown in FIG. 2) with the exception of the positioning of a plurality of clearance gap measurement assemblies 528. Assemblies 528 are positioned on an axially forward-most and aft-most surface of rotor 518. In this alternative embodiment, assemblies 528 are substantially similar to assemblies 218, 220, and 222 (shown in FIG. 2). Wind turbine 500 at least partially differs from wind turbine 400 in that bearing 426 (both shown in FIG. 4) may be configured to support greater load than bearing 526. This is due to bearing 526 being configured as a "start-up" bearing that supports rotor 518, hub/rotor 504 and blades 506 during periods that generator 516 is not in service. In the embodiment of FIG. 5, generator 516, in conjunction with an associated clearance gap control system, cooperates with bearing 526 to provide radial support of rotor 518 and hub/rotor 504.

During periods of operation wherein generator 516 is not in service, bearing 526 provides support of rotor 518, hub/rotor 504 and blades 506. During periods of operation wherein generator 516 is in service, rotation of hub/rotor 504 rotatably drives generator rotor 518 and rotor 518 rotation facilitates generator 516 production of electrical power. As the electrical load on generator 516 is increased, the load carrying capabilities of generator 516 are increased and the relative proportion of load on bearing 526 is decreased. In the event that some wind forces are such that blades 506 tend to be positioned to a deflected position, torsional loads and subsequent stresses may be induced within blades 506. These stresses are transferred from blades 506 to hub/rotor 504 via load transfer regions 512. The transferred stresses within hub/rotor 504 are transferred to rotor 518 and bearing 526. In some instances, stresses transferred into hub/rotor 504 may deflect hub/rotor 504 and rotor 518 such that hub/rotor 504 and rotor 518 radial positions may be within the tolerances of bearing 526 such that gap 524 dimension is altered and predetermined gap 524 dimension tolerances are approached. Assemblies 528 monitor gap 524 dimensions of and/or the magnetic flux of gap 524 and transmit the associated clearance gap radial dimension signals, or gap dimension signals, and/or clearance gap magnetic flux signals, or flux signals, (neither shown in FIG. 5) to the control system (not shown in FIG. 5).

The control system operates in a PWM manner to control the frequency, the phase angle and the amplitude of the voltage and current (and, therefore, power) signals generated in, and transmitted from, windings 523 and 525. Specifically, in the event that rotor 518 is deflected such that gap 524 dimension is not uniform within generator 516, the associated radial air gap flux in gap 524 is adjusted. The overall effect is to adjust the attractive forces induced within generator 516 between rotor 518 and windings 523 and 525 to reposition rotor 518 such that gap 524 dimensions measured by assemblies 528 are substantially similar. In this manner, generator 516 in conjunction with the associated clearance gap control system, cooperates with bearing 526 to provide radial support and axial positioning of rotor 518 and hub/rotor 504.

The methods and apparatus for a wind turbine generator control system described herein facilitate operation of a wind turbine generator. More specifically, the wind turbine generator clearance gap control system as described above facilitates an efficient and effective electrical generation and mechanical load transfer scheme. Also, the robust, clearance gap control system facilitates generator efficiency. Such control system also facilitates wind turbine generator reliability, and reduced maintenance costs and wind turbine generator outages.

Exemplary embodiments of wind turbine control systems as associated with wind turbine generators are described above in detail. The methods, apparatus and systems are not limited to the specific embodiments described herein nor to the specific illustrated wind turbine generators.

While the invention has been described in terms of various specific embodiments, those skilled in the art will recognize that the invention can be practiced with modification within the spirit and scope of the claims.

What is claimed is:

1. A generator comprising:
    at least one rotating member;
    at least one stationary member positioned such that a clearance gap is defined between a portion of said rotating member and a portion of said stationary member, wherein said clearance gap is configured to facilitate transmitting a controllable magnetic flux therethrough; and
    a clearance gap control system comprising at least one clearance gap measurement assembly, at least one power converter, and at least one controller, said controller coupled in electronic data communication with said assembly and said converter and configured to modulate a dimension of said gap by modulating said flux.

2. A generator in accordance with claim 1, said assembly comprising at least one of:
    a clearance gap radial dimension measurement apparatus configured to transmit a gap dimension measurement signal; and
    a clearance gap magnetic flux measurement apparatus configured to transmit a clearance gap flux measurement signal.

3. A generator in accordance with claim 1 wherein said converter comprises a plurality of electronic switching devices configured to modulate said flux.

4. A generator in accordance with claim 3 wherein said switching devices comprise at least one of an insulated gate bipolar transistor (IGBT), an integrated gate commutated thyristor (IGCT), and a thyristor.

5. A generator in accordance with claim 1 further comprising:
    at least one controller input channel coupled in electronic data communication with said assembly, said input channel facilitating transmission of a clearance gap measurement signal;
    said controller comprising at least one processor coupled in electronic data communication with said assembly via said input channel, said processor configured to receive said clearance gap measurement signal; and
    at least one controller output channel coupled in electronic data communication with said processor and said converter, said controller output channel facilitates transmission of a controller output signal.

6. A generator in accordance with claim 5 wherein said processor comprises:
    at least one resident conversion algorithm configured to receive said clearance gap measurement signal, said algorithm further configured to generate at least one predetermined processor clearance gap measurement signal;
    at least one resident control algorithm configured to receive said processor clearance gap measurement signal, said control algorithm further configured to generate a processor clearance gap adjustment signal; and
    at least one resident clearance gap adjustment algorithm configured to receive said processor adjustment signal, said clearance gap adjustment algorithm comprising at least one predetermined value, said clearance gap adjustment algorithm configured to generate said controller output signal.

7. A generator in accordance with claim 1 wherein said control system is further configured to at least partially modulate radial support of at least a portion of said rotating member.

8. A generator in accordance with claim 1 wherein said generator is a wind turbine generator.

9. A method of controlling a clearance gap dimension within a generator, the generator having at least one rotating member and at least one stationary member positioned such that a clearance gap is defined between a portion of the rotating member and a portion of the stationary member, said method comprising modulating the clearance gap dimension by modulating a controllable magnetic flux generated within the clearance gap.

10. A method in accordance with claim 9 wherein modulating the dimension by modulating the magnetic flux comprises:
   providing a clearance gap control system that has at least one power converter;
   rotating the rotating member around the stationary member and generating the clearance gap magnetic flux within the clearance gap;
   measuring at least one of the clearance gap dimension and the clearance gap magnetic flux; and
   switching a plurality of switching devices within the converter, thereby modulating the clearance gap magnetic flux, and thereby modulating the clearance gap dimension.

11. A method in accordance with claim 10 wherein providing a clearance gap control system comprises:
   providing at least one clearance gap measurement assembly, the power converter, and at least one controller;
   fixedly coupling the assembly to the stationary member;
   electrically coupling the assembly in data communication with the controller;
   electrically coupling the controller in data communication with the converter; and
   coupling the converter in electrical connection with at least a portion of at least one of the stationary member and the rotating member.

12. A method in accordance with claim 11 wherein fixedly coupling the assembly to the stationary member comprises coupling the assembly to a predetermined radial and circumferential portion of the stationary member using at least one of an adhesive, retention hardware, and tack welding to facilitate measurement of the clearance gap dimension.

13. A method in accordance with claim 11 wherein coupling the assembly to the controller comprises:
   providing at least one controller input channel and at least one processor;
   electrically coupling the assembly in data communication with the controller input channel; and
   electrically coupling the controller input channel in data communication with the processor.

14. A method in accordance with claim 13 wherein coupling the controller to the converter comprises:
   providing at least one controller output channel; and
   electrically coupling the controller in data communication with the controller output channel.

15. A control system for a rotary machine, the rotary machine having at least one rotating member and at least one stationary member positioned such that a clearance gap is defined between a portion of the rotating member and a portion of the stationary member, wherein the clearance gap is configured to facilitate transmitting a controllable magnetic flux therethrough, said control system comprising:
   at least one clearance gap measurement assembly;
   at least one power converter; and
   at least one controller, said controller coupled in electronic data communication with said assembly and said converter and configured to modulate said dimension of said clearance gap by modulating said flux.

16. A control system in accordance with claim 15 said assembly comprising at least one of:
   a clearance gap radial dimension measurement apparatus configured to transmit a clearance gap dimension measurement signal; and
   a clearance gap magnetic flux measurement apparatus configured to transmit a clearance gap flux measurement signal.

17. A control system in accordance with claim 15 wherein said converter comprises a plurality of electronic switching devices configured to modulate said controllable magnetic flux generated within said clearance gap.

18. A control system in accordance with claim 17 wherein said switching devices comprise at least one of an insulated gate bipolar transistor (IGBT), an integrated gate commutated thyristor (IGCT), and a thyristor.

19. A control system in accordance with claim 15 further comprising:
   at least one controller input channel coupled in electronic data communication with said assembly, said input channel facilitating transmission of a clearance gap measurement signal;
   said controller comprising at least one processor coupled in electronic data communication with said assembly via said input channel, said processor configured to receive said clearance gap measurement signal; and
   at least one controller output channel coupled in electronic data communication with said processor and said converter, said controller output channel facilitating transmission of a controller output signal.

20. A control system in accordance with claim 19 wherein said processor comprises:
   at least one resident conversion algorithm configured to receive said clearance gap measurement signal, said algorithm further configured to generate at least one predetermined processor clearance gap measurement signal;
   at least one resident control algorithm configured to receive said processor clearance gap measurement signal, said control algorithm further configured to generate a processor clearance gap adjustment signal; and
   at least one resident clearance gap adjustment algorithm configured to receive said processor adjustment signal, said clearance gap adjustment algorithm comprising at least one predetermined value, said clearance gap adjustment algorithm configured to generate said controller output signal.

* * * * *